United States Patent [19]

Urhahne

[11] Patent Number: 5,754,020
[45] Date of Patent: May 19, 1998

[54] WIPER-WASHER SYSTEM FOR VEHICLES

[75] Inventor: Joseph Urhahne, Cologne, Germany

[73] Assignee: Ford Global Technologies, Inc., Dearborn, Mich.

[21] Appl. No.: 716,488

[22] Filed: Sep. 18, 1996

[30] Foreign Application Priority Data

Sep. 20, 1995 [DE] Germany ............. 195 34 916.4

[51] Int. Cl.$^6$ ............................................. B60S 1/08
[52] U.S. Cl. ............................. 318/444; 318/DIG. 2; 388/830
[58] Field of Search ......................... 318/443, 444, 318/DIG. 2; 388/828, 829, 830, 831

[56] References Cited

U.S. PATENT DOCUMENTS

| 4,339,698 | 7/1982 | Kearns ............................. 318/444 |
| 4,547,716 | 10/1985 | Johnson et al. .................. 318/443 |
| 4,614,886 | 9/1986 | Schneider et al. ............... 310/83 |
| 4,851,745 | 7/1989 | Ponziani ......................... 318/443 |
| 4,857,812 | 8/1989 | Mochizuki et al. .............. 318/15 |
| 4,881,019 | 11/1989 | Shiraishi et al. ............... 318/68 |
| 4,885,512 | 12/1989 | Gille et al. ..................... 318/444 |
| 4,992,671 | 2/1991 | Gille et al. ..................... 307/10.1 |
| 5,200,676 | 4/1993 | Mueller et al. .................. 318/444 |
| 5,404,085 | 4/1995 | Resch et al. .................... 318/443 |
| 5,461,291 | 10/1995 | Boucheron ..................... 318/443 |
| 5,525,879 | 6/1996 | Wainwright .................... 318/443 |

Primary Examiner—Bentsu Ro
Attorney, Agent, or Firm—Mark S. Sparschu

[57] ABSTRACT

A wiper-washer system for vehicles comprises at least one wiper drivable by a wiper motor and a washer device which includes a water reservoir and a water pump motor. The wiper and water pump motors are activated through a switching arrangement. The wiper motor is in the form of a direct current motor with a gearbox, designed for only a single rated speed. In addition a hybrid electronics unit provided with a control, a driver and a power output stage is fitted directly on or in the housing of the wiper motor. It is advantageous that the direct current motor for the wiper is of simpler construction and operates at more favourable working conditions than a two-speed direct current motor conventionally used. By means of the hybrid electronics unit the working current is supplied to the wiper motor in the absence of mechanical contact devices. Compared with conventional wiper-washer systems the outlay on cabling is reduced. Advantageous embodiments of the system are also described.

6 Claims, 3 Drawing Sheets

WIPER-WASHER SYSTEM FOR VEHICLES

FIELD OF THE INVENTION

The invention relates to a wiper-washer system for vehicles.

BACKGROUND OF THE INVENTION

In such systems, which are known for example from U.S. Pat. No. 5,200,676, the wiper motor has three carbon brushes in order to provide two different wiping speeds. The working current required is supplied both to the wiper motor and to the water pump motor, in each case through mechanical switch contacts which are controlled via a central electronics unit common to the wiper motor and the water pump motor.

The design of a two-speed direct current motor represents a compromise in respect of its optimum performance, since at neither of the two speeds is the direct current motor operating at its optimum operating point. The production costs of a direct current motor designed for two speeds are higher than those of a direct current motor designed for a single speed. The dirtying of the commutator due to the constant wearing away of the carbon brushes is greater in the case of a direct current motor with three brushes than in the case of a direct current motor with two carbon brushes.

When the working current of the wiper motor is switched by mechanical switch contacts such as switches, relays and slip rings, aging effects occur due to the mechanical movement and arcing. For the common central electronics unit associated with the wiper motor or motors and the water pump motor a relatively high outlay on wiring is necessary.

OBJECT OF THE INVENTION

An object of the invention is to obviate the above-mentioned disadvantages and to provide wiper-washer systems of the kind referred to for which manufacturing costs are lower and operating conditions for the wiper motor are improved. Other objects are to reduce the number of parts that are mechanically moved, especially in switching operations, and in addition to reduce the outlay on wiring for the wiper-washer system.

SUMMARY OF THE INVENTION

To this end in accordance with the invention the wiper motor is in the form of a direct current motor with a gearbox, designed for only a single rated speed, and a hybrid electronics unit provided with a control, a driver and a power output stage is fitted directly on or in the housing of the wiper motor.

This has the advantages that the manufacturing costs are lower and that the operating conditions of the direct current motor are more favorable than in the case of a direct current motor designed for two speeds. Through the power output stage of the hybrid electronics unit the operating current of the wiper motor is switched in a noncontacting manner in which, as opposed to contact switches, no aging effects occur. The hybrid electronics unit makes smooth starting of the wiper or wipers of the vehicle possible, as compared with the switching of the operating current through mechanical contacts. The association of a hybrid electronics unit with the wiper motor reduces the outlay on wiring for the wiper-washer system, thereby reducing the costs for the assembly of a wiper-washer system in a vehicle compared with those for conventional systems. Fitting the hybrid electronics unit directly on or inside the metal housing of the wiper motor has the advantage that the heat evolved during operation of the hybrid electronics unit is conducted away, so that it is not necessary to provide a special cooling element for the hybrid electronics unit.

While, in accordance with the invention, on activation of the switching arrangement the operating current of the wiper motor is switched via the power output stage of the hybrid electronics system, in a further embodiment of the invention the operating current can be supplied directly to the water pump motor via the switching arrangement. This has the advantage that the water pump motor can be driven bidirectionally without the need for a full bridge including a power output stage. In a further embodiment of the invention, when the switching arrangement is in a "slow wipe" position the form of the output signal from the hybrid electronics system fed to the wiper motor may be such that the rated voltage is applied to the wiper motor during a wiping cycle and that then no voltage is applied for a short time, so that the wiper remains in a rest position before a new wiping cycle starts. Although the direct current motor used as wiper motor is only designed for a single rated speed, the second—legally required—wiping stage is realized through the time interval provided between two wiping cycles.

Alternatively, in a "slow wipe" switch position of the switching arrangement the output signal of the hybrid electronics system fed to the wiper motor may be a pulse modulated voltage signal, so that in this switch position the wiping speed is reduced compared with the nominal speed at the rated speed of the wiper motor.

If the vehicle has a plurality of wipers each with a separate wiper motor, in a further embodiment of the invention a separate electronics unit may be associated with each wiper motor. The advantage of this is that the power output stages of the hybrid electronics units can be individually tailored to the power requirements of the respective wiper motors.

In a further embodiment of the invention the control and driver stages of the respective hybrid electronics units are identical for wiper motors for both a front wiper device and a rear wiper device. An advantage of this is that at least the control and driver stages of the hybrid electronics units for the front wiper motor and the rear wiper motor can be arranged on one chip so that this chip can be used both for the front wiper motor and for the rear wiper motor. In a further embodiment of the invention the activation device of the switching arrangement can be in the form of a resistance coded switch for all functions of the wiper device(s). This has the advantage that a multiplicity of different switch positions can be detected via a single switch lead.

Another possibility, in accordance with the invention, is for an input signal from a cam switch located in the wiper motor housing and indicating the rest position of the wiper to be fed to the hybrid electronics system. This enables the rest position of the wiper to be identified. As compared with prior art wiper-washer systems this has the advantage that the three slip rings in the gears of the direct current motors that are used for these systems can be omitted.

Alternatively in a further embodiment of the invention a Hall sensor can be provided for the purpose of recognizing the rest position of the wiper. The Hall sensor can, for example, be fitted on the motor shaft of the wiper motor.

In a further embodiment of the invention the control stage of the hybrid electronics unit can be designed for individually programmable intermittent wiping.

Finally, input signals from a rain sensor may be supplied to the hybrid electronics unit, thus giving the possibility of completely automated wiping.

BRIEF DESCRIPTION OF THE DRAWINGS

Further embodiments, advantages and features of the invention will be apparent from the following description of an exemplary embodiment of the invention, with reference to the accompanying drawings, in which.

DETAILED DESCRIPTION OF A PREFERRED EMBODIMENT OF THE INVENTION

Figure 1:
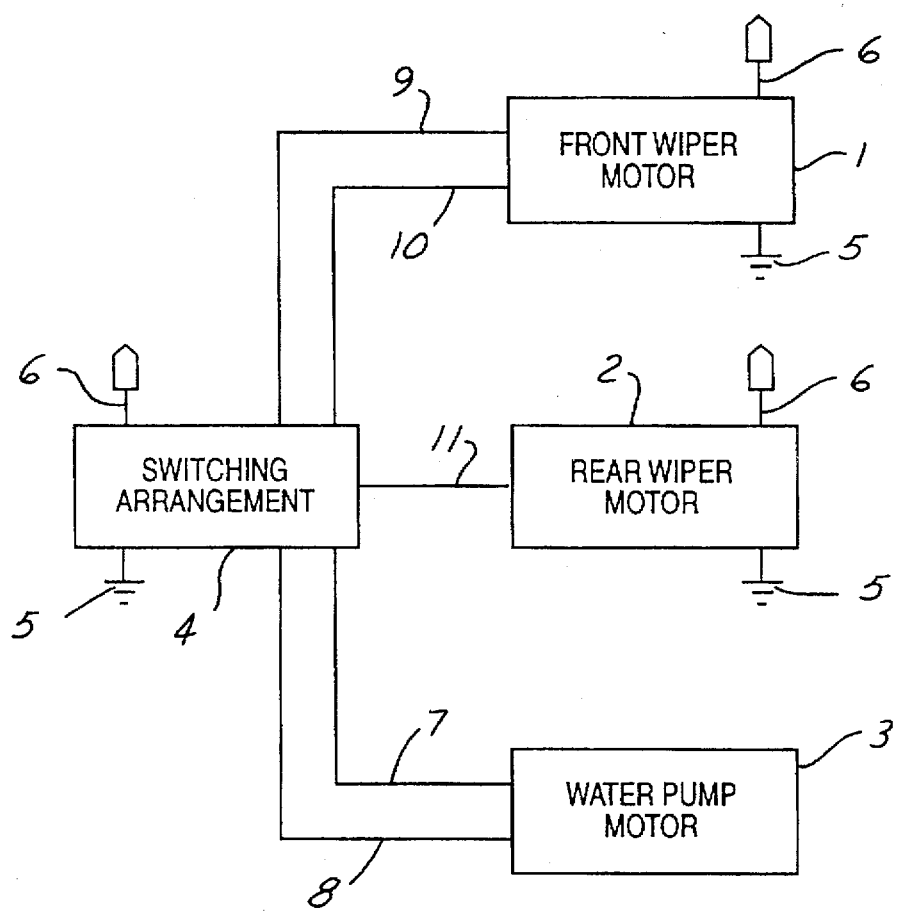
FIG. 1 is a schematic block diagram of a wiper-washer system of a vehicle, comprising a front wiper device, a rear wiper device, a water pump motor and a switching arrangement.

A vehicle (not shown) has a wiper-washer system including a front screen wiper (not shown) and a rear screen wiper (not shown). A front wiper motor 1 is associated with the front wiper and a rear wiper motor 2 is associated with the rear wiper. In addition a washer device including a water reservoir (not shown) and a water pump motor 3 is provided, which is associated with both the front wiper and the rear wiper. The water pump motor 3 can, as will be described in more detail below, be operated bidirectionally. Activation of the wiper-washer system is performed using a switching arrangement 4, which is usually located in the passenger compartment of the vehicle, for example on or in the vicinity of the steering column of the vehicle. From FIG. 1 it can also be seen that both the wiper motors 1 and 2 and also the switching arrangement 4 are connected electrically both to ground 5 and to a power supply 6, while the water pump motor 3 is connected electrically through leads 7 and 8 to the switching arrangement 4, and is supplied electrically through these. Leads 9 and 10 run from the switching arrangement 4 to the front wiper motor 1, the lead 9 carrying an indication of which of several switch positions has been selected, for example "slow wipe", "fast wipe", "intermittent wipe" or "off". The same applies to a lead 11 running to the wiper motor 2. The lead 10 serves to transmit signals for variable intermittent switching.

Figure 2:
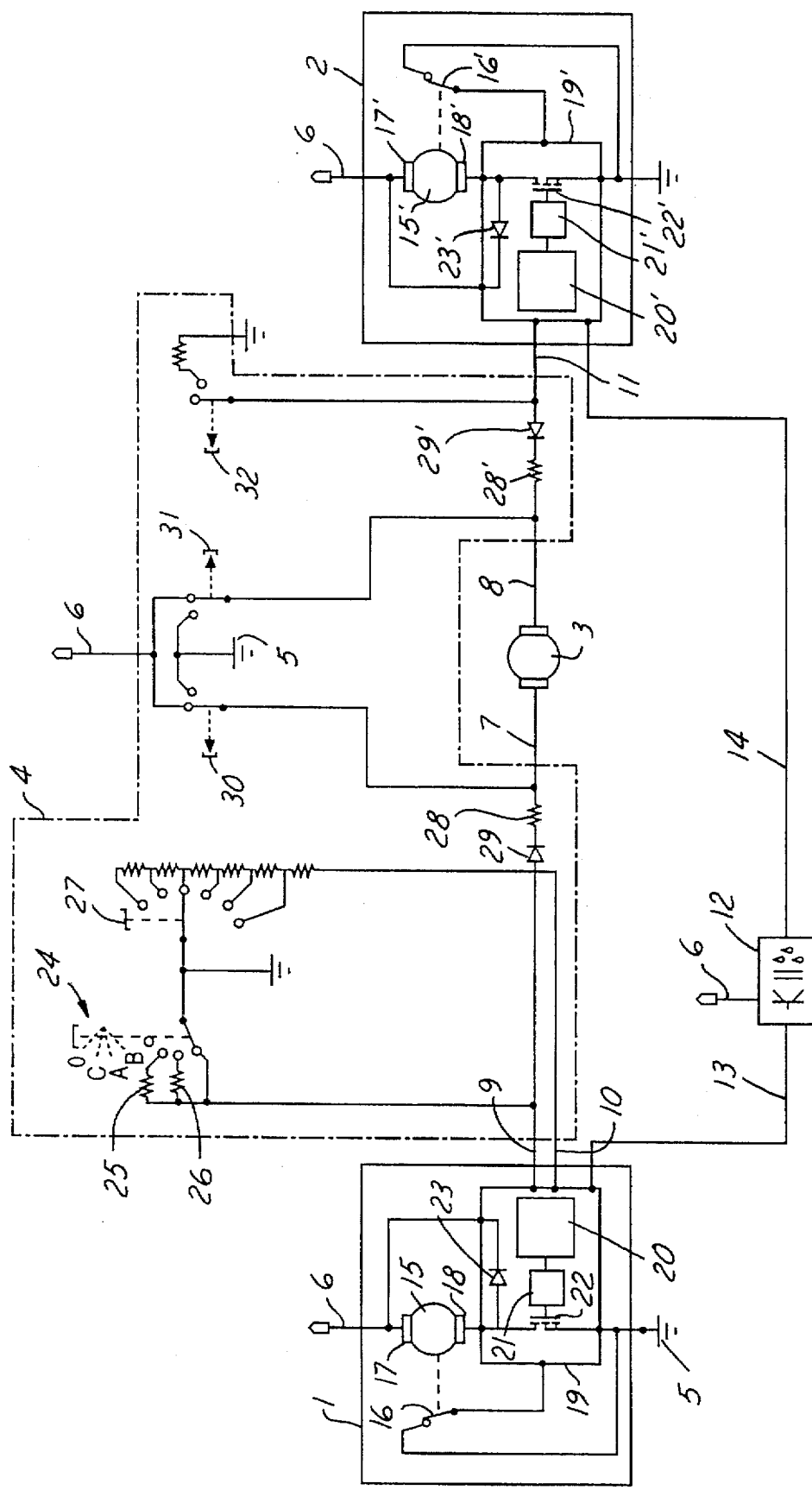
FIG. 2 is a schematic circuit diagram of the front wiper motor, the rear wiper motor and the water pump motor, together with a drawing of the switching arrangement divided into the functions of the above-mentioned elements.

FIG. 2 shows, in addition to the elements shown in FIG. 1, a rain sensor 12, which is connected to the wiper motors 1 and 2 through leads 13 and 14.

The wiper motor 1 provided for the front wiper device has a direct current motor 15 designed for only a single rated speed and having a gearbox (not shown) connected to it. A cam switch 16 is fixed in position on a housing of the gearbox and is operable by way of a cam (not shown) installed on the gearbox shaft. The single speed direct current motor 15 has only two brushes 17 and 18. The direct current motor 15 and the gearbox (not shown) have a common housing (not shown). Directly on this housing is mounted a hybrid electronics unit 19, which includes a control stage 20, a driver stage 21 and a power output stage 22. In the exemplary embodiment shown the hybrid electronics system 19 also includes a free-wheeling diode 23 which is connected antiparallel to the direct current motor 15 and serves as a protection diode for it.

As can be seen from the drawings, the switching of the operating current of the direct current motor 15 takes place by way of the power output stage 22. The operating current is thus switched in a contactless manner. The elements associated with the rear wiper motor 2 correspond to the elements associated with the front wiper motor 1, and respectively bear the same reference numerals, with the addition of "'". These elements will not be separately described again.

The switching device 4 is in the form of a resistance coded switch for all functions of the wiper devices. A front wiper switch indicated schematically by 24 can be switched into the following positions: O (off), I (intermittent wipe), A (for slow wiping) and B (wiping at the nominal speed). In addition a non-latchable switch position T is provided which corresponds electrically to the switch position A. The switch positions I and A have different resistors 25 and 26 associated with them. As a result of the different resistors different signals can be supplied to the wiper motor 1 through the one lead 9.

Figure 3:
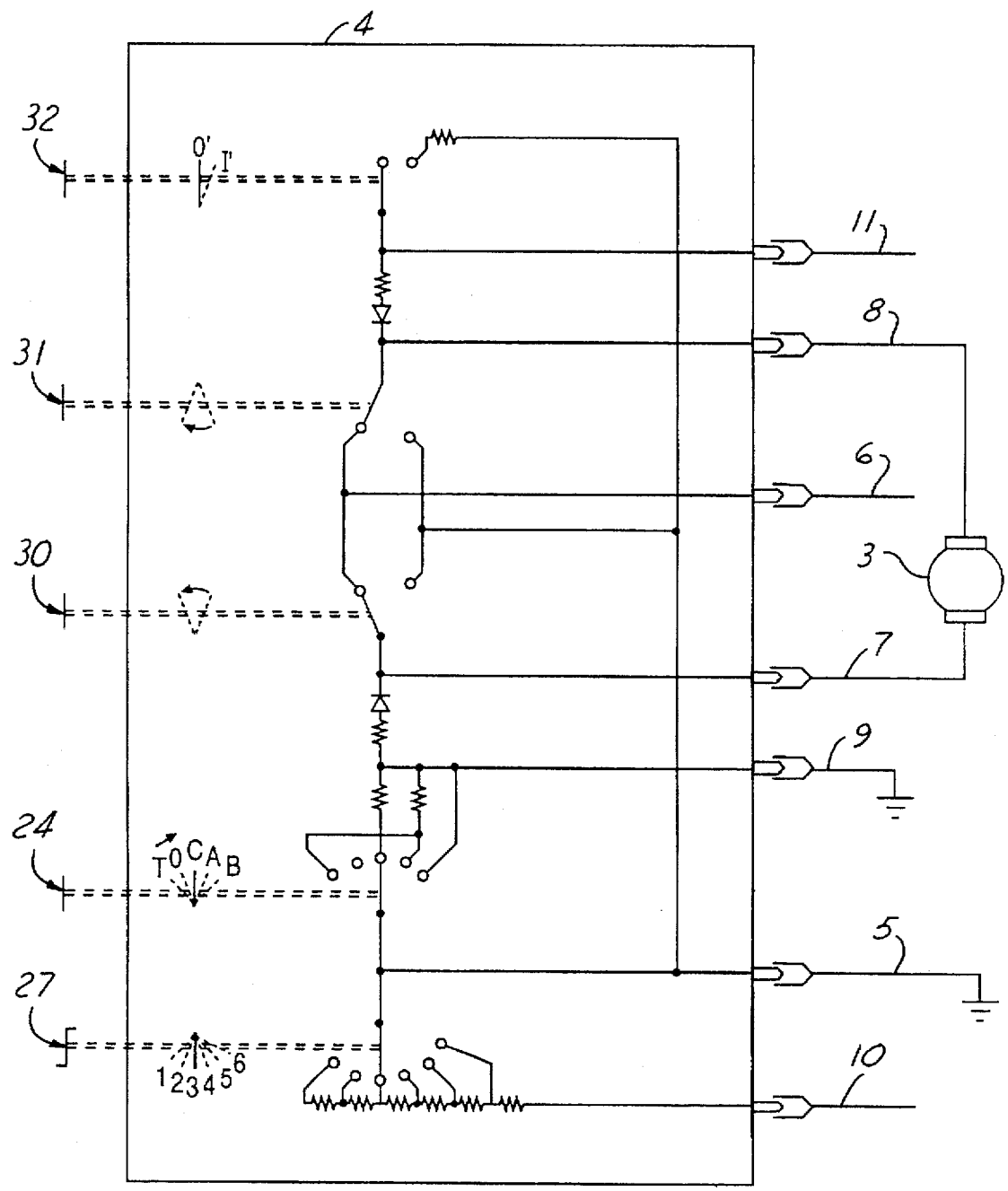
FIG. 3 shows the internal circuit diagram of the switching arrangement.

In FIG. 3 a further possible variant is also illustrated diagrammatically. This variant includes a switch 27 for interval wiping, with multiple switch positions. Here, too, a number of resistances are provided, so that different switching signals can be sent by way of the lead 10. The different switch positions which can be read by way of the cable 10 serve to provide variable time interval settings for the intermittent mode.

In the lead 9 a resistor 28 and a decoupling diode 29 are provided. In the lead 11 a corresponding resistor 28' and a corresponding decoupling diode 29' are provided. The resistors 28 and 28' serve to detect the signal "wash" (front wash or rear wash respectively). The control of the water pump motor 3 takes place by means of switches 31 and 30. For example, on operation of the switch 30 the motor runs in the direction in which the pump supplies water to the front windscreen, by setting the lead 7 to ground potential, while voltage is applied to the lead 8 through the closed switch 31. The switches 30 and 31 are connected to the hybrid electronics units 19 and 19' respectively by way of the respective leads 9 and 11. By means of the resistance coding resulting from the resistors 28 and 28' the respective hybrid electronics unit identifies operation of the switch 30 or 31 and hence the command of the wiping process in addition to the washing process, whereby the respective wiper motor 1 or 2 is operated. A rear wiper switch is indicated by 32. This switch, too, is in the form of a resistance-coded switch, with a resistor 26' the value of which corresponds to the value of the resistor 26 and thus serves as coding for the intermittent wiping function.

Various other modifications and variations will no doubt occur to those skilled in the arts to which this invention pertains. Such variations which generally rely on the teachings through which this disclosure has advanced the art are properly considered within the scope of this invention. This disclosure should thus be considered illustrative, not limiting; the scope of the invention is instead defined by the following claims.

What is claimed is:

1. A wiper-washer system for vehicles, comprising at least one wiper drivable by a wiper motor and a water pump motor, and also comprising a switching arrangement effecting activation of said wiper motor and said water pump motor, characterized in that:

the at least one wiper motor (1, 2) are each in the form of a direct current motor (15, 15'), each designed for only a single rated speed, and that a hybrid electronics unit (19, 19') provided with a control, a driver and a power output stage (20, 20'; 21, 21'; 22, 22' respectively) is fitted directly on or in the housing of each said wiper motor;

on activation by the switching arrangement (4) the operating current of each wiper motor (15, 15') is switched via the power output stage (22, 22') of the hybrid electronics unit (19, 19') fitted directly on or in the housing of the wiper motor, and that operating current is supplied directly to the water pump motor (3) via the switching arrangement (4);

when the switching arrangement (4) is in an "interval wipe" position (I) the form of the output signal from a hybrid electronics unit (19, 19') fed to a said direct current motor (15, 15') is such that a voltage is applied to said direct current motor during a wiping cycle and that then no voltage is applied for a short time, so that the wiper remains in a rest position before a new wiping cycle starts;

when the switching arrangement (4) is in a "slow wipe" switch position (A) the output signal of a hybrid electronics unit (19, 19') fed to a direct current motor (15, 15') is such that the wiping speed is reduced compared with the nominal speed of said direct current motor (15, 15'); and the activating device of the switching arrangement (4) is in the form of a resistance coded switch for all wiping functions (27, 24, 32).

2. A wiper-washer system according to claim 1, characterized in that an input signal originating from a cam switch (16, 16') fitted in the housing of the wiper motor (1, 2) and indicating the rest position of the wiper can be supplied to the hybrid electronics unit (19, 19').

3. A wiper-washer system according to claim 1, characterized in that a Hall sensor is provided for the purpose of detecting the rest position of the wiper.

4. A wiper-washer system according to claim 3, characterized in that the control stage (20, 20') of the hybrid electronics unit (19, 19') is designed for individually programmable intermittent wiping.

5. A wiper-washer system according to claim 4, characterized in that input signals from a rain sensor (12) can be supplied to the hybrid electronics unit (19, 19').

6. A wiper-washer system according to claim 1, characterized in that a plurality of wipers each with a separate direct current motor (15, 15') are provided with associated hybrid electronics units (19, 19').

* * * * *